CHARLES F. CHENOT
MAHLON DENNIS
INVENTORS

BY *Owen J. Meagan*
ATTORNEY

United States Patent Office 3,548,238
Patented Dec. 15, 1970

3,548,238
ELECTRIC DISCHARGE DEVICE CONTAINING A TERBIUM ACTIVATED ZINC CADMIUM BORATE PHOSPHOR
Charles F. Chenot, Towanda, and Mahlon Dennis, Sutton Court, Pa., assignors to Sylvania Electric Products Inc., a corporation of Delaware
Original application Oct. 15, 1968, Ser. No. 767,677. Divided and this application Dec. 8, 1969, Ser. No. 882,887
Int. Cl. H01j 63/04
U.S. Cl. 313—109     3 Claims

ABSTRACT OF THE DISCLOSURE

A low pressure electric discharge device containing a zinc cadmium borate phosphor of the formula $$ZnO \cdot 2CdO \cdot 2B_2O$$

Figure 1:
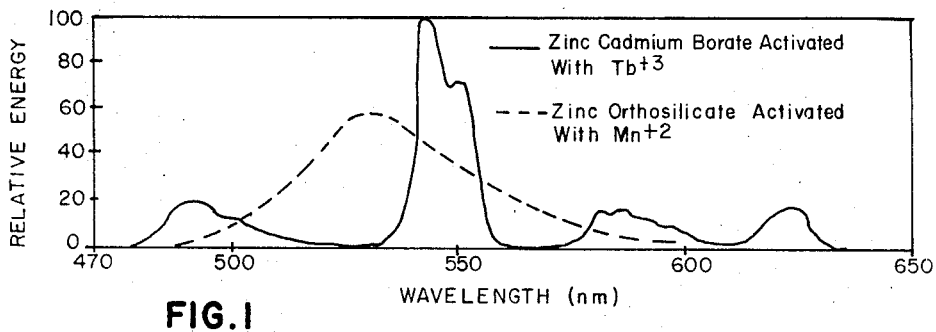

activated by trivalent terbium. The phosphor can be modified by the inclusion of $Ga_2O_3$.

BACKGROUND OF THE INVENTION

Field of the invention

This application is a division of Ser. No. 767,677, filed Oct. 15, 1968.

This invention relates to synthetic inorganic phosphors. More precisely, the invention disclosed herein relates to compounds of zinc cadmium borate activated by terbium which function as useful phosphors when exposed to a source of activating radiation. These compounds can be modified by the inclusion of gallium in the matrix.

DESCRIPTION OF THE PRIOR ART

Phosphors are known, useful products of commerce. Generally the term is employed in theart to describe fluorescent or luminescent solids which comprise two essential ingredients: a host matrix and an activator. Better known host matrices include diverse silicates, phosphates, sulfides, selenides, the alkali halides and oxides of barium, magnesium, calcium, zinc and others which could be mentioned. Activators most frequently employed include among others, copper, silver, thallium, lead, cerium, chromium, titanium and tin. Oftentimes, mixtures of activators are employed to produce phosphors of enhanced or specialized properties. The amount of activator employed can vary over a rather wide range. For example, amounts of activator ranging from only a few parts per million up to several percent can be employed. Generally, synthetic inorganic phosphors are readily prepared by reacting well mixed, finely divided powders of the host matrix and activator(s) at elevated temperatures.

Phosphors comprising a host matrix activated by terbium are known to the art. For example, phosphors having a host matrix of the alkaline earth borates activated by terbium were reported in an article by W. L. Wanmaker, A. Bril and J. W. ter Vrugt in J. Electrochem. Soc., 112, 1147–1150 (1965). Phosphors of this type however exhibit low quantum efficiencies; a phenomenon too often encountered in terbium activated phosphors.

The existence of the above discussed deficiencies in many of the known terbium activated phosphors is considered unfortunate by those skilled in the art. For example, terbium activated phosphors are among the very few narrow band emitting phosphors which fluoresce in the green region of the spectrum. Accordingly, any invention whereby improved terbium activated phosphors can be presented to the art would be indeed a notable and valuable contribution to the art.

SUMMARY OF THE INVENTION

In accordance with the present invention, compounds having host matrices of 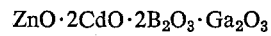 and

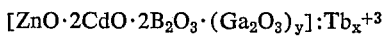

activated by terbium are presented as new and useful phosphors. Accordingly, the phosphors which are the subject of the present invention can be more precisely defined by the following formula:

$$[ZnO \cdot 2CdO \cdot 2B_2O_3 \cdot (Ga_2O_3)_y]:Tb_x^{+3}$$

where the  portion represents the host matrix and $Tb_x^{+3}$ represents the activator system. Also in the above formula $x$ represents the gram atoms of terbium per gram mole of phosphor substituted for the gram atoms of Cd in the host matrix. The symbol $y$ represents the gram moles of the host matrix modifier $Ga_2O_3$ per gram mole of phosphor. The amount of terbium employed as an activator in the phosphors of the present invention can vary over a wide range. However, the best balance of properties are obtained in phosphors wherein the concentration of terbium is between about 0.001 to about 0.2 gram atom terbium per gram mole of phosphor. Accordingly, in the preferred phosphors of the present invention, $x$ is an integer between about 0.001 to about 0.2.

As stated before, the phosphors presented with one aspect of the present invention are those having a host matrix of $ZnO \cdot 2CdO \cdot 2B_2O_3$ activated by terbium. Accordingly, the formula set forth above describes this aspect of the invention when $y=0$ and $x$ is an integer between about 0.001 to about 0.2. However, in accordance with another aspect of the invention, it has been unexpectedly discovered that the inclusion of minor amounts of $Ga_2O_3$ in the host matrix noticeably enhances the ability of the host matrix to absorb the activating ultraviolet light. In turn, this increased absorption gives rise to greater fluorescent intensity of the phosphor. The amount of gallium oxide employed in accordance with this aspect of the invention can vary over a rather wide range. For example, oftentimes the use of about 0.001 gm. mole of gallium oxide per 2 gram moles of $B_2O_3$ gives rise to noticeable improvement in the intensity of the phosphor. In general, no more than about 0.1 gram atom of gallium oxide per gram mole of phosphor need be employed. Accordingly, in this aspect of the invention, which represents the especially preferred embodiment thereof, $y$ is between about 0.001 to about 0.1 while $x$ is between about 0.001 to about 0.2.

DESCRIPTION OF THE PREFERRED EMBODIMENTS

Figure 2:
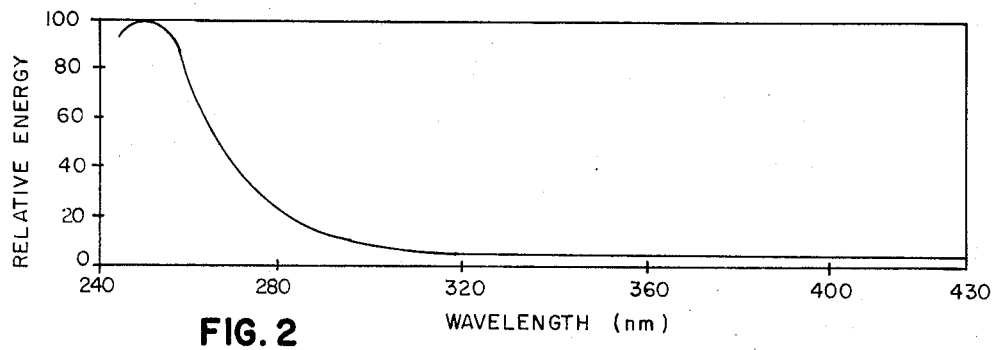

When exposed to 2537 A. excitation, the phosphors of the present invention emit a relatively bright yellow-green color. Accompanying FIGS. 1 and 2 illustrate the properties of a terbium activated phosphor representative of the phosphors of this type included within the scope of the present invention. FIG. 1 compares the emission spectrum of a phosphor of the present invention (a zinc cadmium borate activated by $Tb^{+3}$) with a known phosphor of zinc orthosilicate activated by manganese. FIG. 2 illustrates the excitation spectrum for the phosphor of zinc cadmium borate activated by $Tb^{+3}$.

As mentioned above, the fluorescent intensity of the phosphors of the type shown in FIGS. 1 and 2 can be modified by including a minor amount of gallium oxide in the activator system.

From the above, it will be apparent that the phosphors of the present invention can be advantageously utilized in fluorescent lamps. Their utility in this function will be better understood by reference to accompanying FIG. 3.

Figure 3:
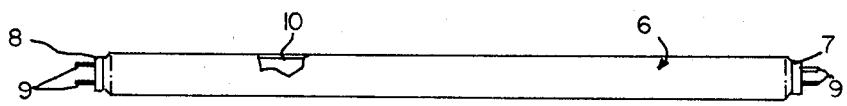

Referring now to FIG. 3, a typical fluorescent lamp containing mercury vapor is shown including a glass envelope 6 having cap ends 7 and 8 with electrical lead-in wires 9. A layer 10 of a phosphor of the present invention is coated on the internal surface of the glass envelope 6.

The phosphors of the present invention can be prepared readily by the high temperature reaction of mixtures of decomposable compounds containing the ingredients of the host matrix and activator system. Suitable decomposable compounds include the carbonates, halides, oxides, hydroxides, oxalates, tartrates, acetates and the like. Especially preferred are those decomposable compounds which can be decomposed at temperatures below about 700° C. Chemical and physical manners of obtained mixtures of the decomposable compounds such as co-precipitation, mortaring, ball milling and the like are well known to the art and need not be discussed in detail here.

Non-limiting, illustrate examples of methods for preparing phosphors of the present invention follow:

EXAMPLE I

Mix the following ingredients:

| | Relative moles |
|---|---|
| Cadmium nitrate tetrahydrate (reagent grade) | 1.940 |
| Zinc nitrate hexahydrate (reagent grade) | 1.000 |
| Boric acid (3.6% excess) (reagent grade) | 4.144 |
| Terbium oxalate decahydrate (99.999% pure) | 0.030 |

Fire the above mixture for 16 hours at 700° C. in air. Remove the fired mixture and cool. Refire the mixture for 4 hours at 700° C. in air, then grind the resulting phosphor.

EXAMPLE II

Repeat the procedure of Example I but mix the following ingredients:

| | Relative moles |
|---|---|
| Cadmium nitrate tetrahydrate (reagent grade) | 1.940 |
| Zinc nitrate hexahydrate (reagent grade) | 1.000 |
| Boric acid (3.6% excess) (reagent grade) | 4.144 |
| Terbium oxalate decahydrate (99.999% pure) | 0.030 |
| Gallium oxide (99.999% pure) | 0.010 |

As our invention, we claim:

1. A low pressure electric discharge device comprising a glass envelope containing mercury vapor; means to produce an electrical discharge within said device; and said device having a phosphor disposed upon the inner surface of said envelope, said phosphor having a host matrix and an activator according to the formula:

$$[ZnO \cdot 2CdO \cdot 2B_2O_3 \cdot (Ga_2O_3)_y]:Tb_x$$

wherein $[ZnO \cdot 2CdO \cdot 2B_2O_3 \cdot (Ga_2O_3)_y]$ is the host matrix and trivalent $Tb_x$ is the activator, and said $x$ represents the moles of terbium in the host matrix and is between about 0.001 and 0.2 per mole of host matrix and said $y$ represents the moles of digallium trioxide in the host matrix and is less than about 0.1 mole per two moles of $B_2O_3$.

2. The device according to claim 1 wherein $y=0$.
3. The device according to claim 1 wherein $y$ is between about 0.001 and 0.1.

References Cited

UNITED STATES PATENTS

3,375,465    3/1968    Brixner _____ 252—301.6

OTHER REFERENCES

Harrison et al.: Journal of the Electrochemical Society, vol. 106, No. 1, January 1959, pp. 24–26.

TOBIAS E. LEVOW, Primary Examiner

J. COOPER, Assistant Examiner